United States Patent [19]
Yowell et al.

[11] Patent Number: 5,271,485
[45] Date of Patent: Dec. 21, 1993

[54] HYDRAULIC DAMPER

[75] Inventors: Gordon Yowell; Duane Samuelson, both of Boca Raton, Fla.; William E. Davis, Jr., North Middletown, Ky.

[73] Assignee: Predator Systems Inc., Boca Raton, Fla.

[21] Appl. No.: 949,693

[22] Filed: Sep. 23, 1992

[51] Int. Cl.⁵ .............................. F16F 5/00
[52] U.S. Cl. .................. 188/312; 188/317; 188/322.15; 188/322.22; 267/150
[58] Field of Search ........... 188/269, 312, 314, 315, 188/317, 322.15, 322.17, 322.22, 311, 316; 267/64.26, 150; 280/708, 709

[56] References Cited

U.S. PATENT DOCUMENTS

| | | | |
|---|---|---|---|
| 3,105,574 | 10/1963 | Hoffmann et al. | 188/317 X |
| 3,229,951 | 1/1966 | Quick | 267/150 X |
| 3,933,337 | 1/1976 | Morris | 251/54 |
| 3,944,031 | 3/1976 | Cholet | 188/317 |
| 4,099,602 | 7/1978 | Kourbetsus | 188/300 |
| 5,078,239 | 1/1992 | Kobayashi | 188/280 |

FOREIGN PATENT DOCUMENTS

| | | | |
|---|---|---|---|
| 697799 | 10/1940 | Fed. Rep. of Germany | 188/88 |
| 2511289 | 9/1975 | Fed. Rep. of Germany | 267/64.26 |

*Primary Examiner*—Robert J. Oberleitner
*Assistant Examiner*—Lee W. Young
*Attorney, Agent, or Firm*—Alvin S. Blum

[57] ABSTRACT

A hydraulic damper has a dashpot piston reciprocating in a cylinder bore. Piston rods extend axially from both sides of the piston. Sealing structures at both ends of the cylinder connect to the cylinder and sealingly engage the piston rods to form two symmetrical hydraulic working chambers divided by the dashpot piston. A narrow passage through the piston provides a restricted fluid flow path between the two working chambers for hydraulic damping of piston motion. A cavity in the first piston rod is provided with a spring-biased, sliding reservoir piston forming a pressurized hydraulic fluid reservoir connected to the midpoint of the narrow passage between working chambers by a narrow conduit. Both narrow passage and conduit have fixed dimensions and no valves. A cavity in the second piston rod contains a spring centering mechanism.

12 Claims, 1 Drawing Sheet

HYDRAULIC DAMPER

BACKGROUND OF THE INVENTION

1. Field of the Invention

The present invention relates to motion dampening devices and more specifically to a bidirectional hydraulic damper of the reciprocating piston type with spring centering and a spring loaded hydraulic reservoir.

2. Prior Art

Hydraulic dampening devices well known in the art employ a cylinder and a piston rod reciprocating in the cylinder. A piston on the end of the rod sealingly engages the cylinder wall and divides the cylinder into two asymmetrical hydraulic chambers. Restrictive passages between the two chambers retard the rate of fluid flow therebetween to provide a damping action. To compensate for loss of fluid from leakage and thermal volume changes, a fluid reservoir may be provided as exemplified by U.S. Pat. Nos. 3,933,337 issued Jan. 20, 1976 to Morris et al.; 3,944,031 issued Mar. 16, 1976 to Cholet et al and 4,099,602 issued Jul. 11, 1978 to Kourbetsus. generally employ valve mechanisms in the passages and provide asymmetrical damping forces. These are trouble prone, expensive to manufacture and maintain, and provide no convenient means for checking and refilling the fluid reservoir. Their structure is so complex that they are not adaptable to size reduction for those applications requiring light weight and small size such as flight control surfaces.

SUMMARY OF THE INVENTION

It is accordingly an object of the invention to provide a reciprocating piston hydraulic damper having substantially the same damping properties in both directions with spring biased centering means and a spring biased hydraulic fluid reservoir that is free of valves. It is another object that the damper be provided with simple means for checking and replenishing the hydraulic fluid supply in the reservoir. It is yet another object that the damper be of simple and inexpensive structure suitable for miniaturization and prolonged trouble free operation. The damper of the invention comprises a cylinder with a straight uniform bore; a dashpot piston on a piston rod sealingly engaging the bore of the cylinder and dividing the cylinder into two symmetrical hydraulic chambers; a first narrow fluid passage through the piston providing a resistive fluid flow path between the two chambers; a spring biased hydraulic fluid reservoir in the piston rod; a second narrow fluid passage connecting the reservoir with the mid point of the first narrow fluid passage; and spring centering means for maintaining the piston at a predetermined position within the cylinder when unloaded. A tubulation having the same outside diameter as the piston rod extends from the piston. It contains a spring biased spring centering mechanism and provides for uniform annular spaces on both sides of the piston for symmetry of the two hydraulic working chambers as well as widely spaced bearings for the piston.

These and other features, objects and advantages of the invention will become more apparent when the detailed description is considered in conjunction with the accompanying drawings, in which:

DETAILED DESCRIPTION OF PREFERRED EMBODIMENT

Figure 2:
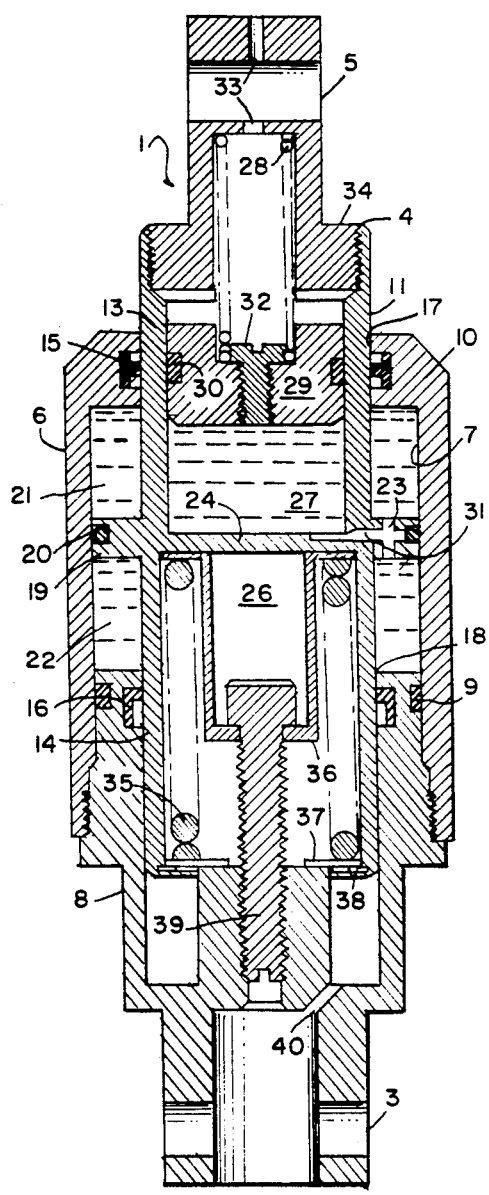
FIG. 2 is a longitudinal sectional view taken through line 2—2 of FIG. 1.
Figure 1:
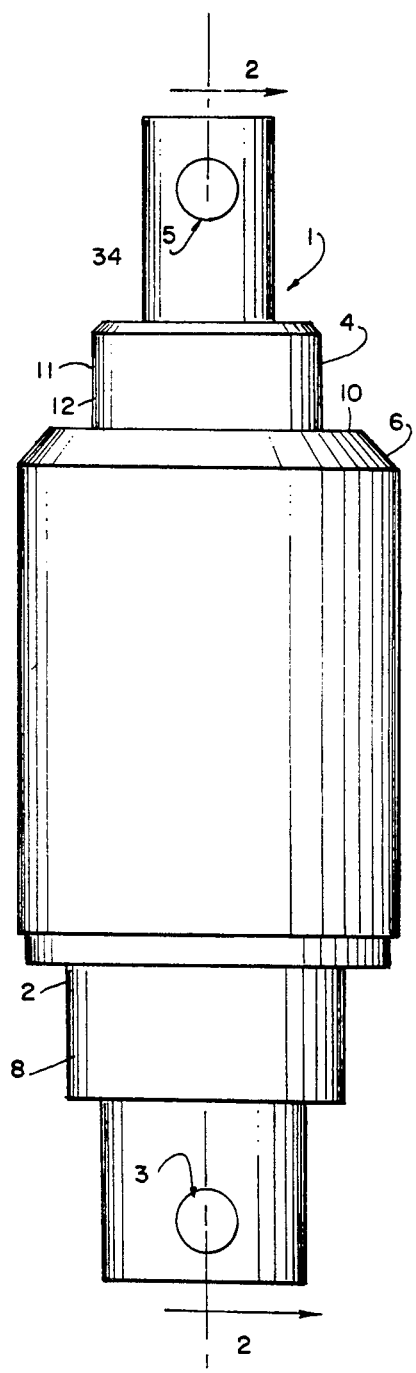
FIG. 1 is an outside elevational view of a hydraulic damper constructed according to the invention.

Referring now to FIGS. 1 and 2, the damper 1 of the invention comprises a cylinder assembly 2 with a first attachment 3 and a piston assembly 4 that reciprocates in the cylinder assembly and carries a second attachment 5. The movement of first attachment 3 relative to second attachment 5 is dampened by a hydraulic mechanism and their unloaded relative positions is determined by a spring bias centering mechanism.

The cylinder assembly 2 comprises a cylinder body 6 partially closed at one end 10 by a partition and having a uniform bore 7 that forms the outer wall of the hydraulic chamber. Fitted into the open end of the bore is cylinder end 8 sealed by static seal 9 and carrying the first attachment 3.

The piston assembly 4 comprises a straight rod 11 having a smooth outside diameter 12. A first end portion 13 of the rod passes through a hole 17 in the closed wall 10 of the cylinder body and dynamic seal 15 acts as a bearing and hydraulic seal between rod and cylinder body. A second end portion 14 of the rod passes through a hole 18 in the cylinder end 8. Dynamic seal 16 acts as a bearing and hydraulic seal between rod and cylinder end. At an intermediate area between the two end portions, the rod 11 is provided with an expanded diameter portion which acts as a dashpot piston 19, with rod end portions 13 and 14 extending in opposite directions therefrom. It bears a sealing piston ring 20 of fluorocarbon plastic to divide the annular space between the outside diameter 12 of rod 11 and the cylinder bore 7 into two symmetrical working hydraulic chambers 21 and 22 that are filled with hydraulic fluid. The hydraulic fluid being incompressible, resists the translatory motion of piston 19 in cylinder bore 7.

A narrow passage 23 provides a restrictive path for viscous fluid flow between the two working chambers 21, 22. This provides the well-known hydraulic damping action, permitting slow motion of the piston and resisting fast motion. This piston is supported by the two opposed bearing seals 15 and 16 which provide support against lateral forces much more effectively than the usual structure of supporting a piston at only one end.

The piston rod 11 is bored out from both ends to form cavities 25, 26, leaving a central partition 24, the cavities being occupied by a hydraulic fluid reservoir 27 and a spring biased centering, respectively. The dynamic seals 15 and 16 may be T or L shaped. They have a large footprint on the static surface and a narrow footprint on the dynamic surface to prevent rolling and leaking and to provide a low friction seal. Some leaking of hydraulic fluid is expected with use. And expansion and contraction of the fluid and the spaces is to be expected with temperature changes. To compensate for these effects, a hydraulic fluid reservoir 27 is provided. It is held under pressure by spring 28 acting on reservoir piston 29 sealed with seal 30. The reservoir is in fluid communication with the two working chambers by narrow passage 31 which enters passage 23 at its midpoint between the two working chambers, so that fluid flow and pressure relationships to the two chambers is the same without the need for valves. A sealing screw 32 provides access for refilling the reservoir 27. As the reservoir is depleted, screw 32 moves down. The fluid level in the reservoir can be checked by simply inserting a rod (not shown) through apertures 33 in rod end 34. Rod end 34 may be unscrewed for access to screw 32 for refilling the reservoir.

The spring centering mechanism in cavity 26 comprises a centering compression spring 35 acting between a cup 36 bearing against the central wall 24 of the piston and a washer 37. The washer is held in place by retaining ring 38 in piston rod 11. Fixing screw 39, threaded into cylinder end 8 fixes the cup 36 to the cylinder end 38. vent 40 provides free air passage to cavity 26.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

We claim:

1. A hydraulic damping device adapted for connection between two relatively movable members of the type in which a piston reciprocates within a fluid-filled cylinder, said device comprising:

said cylinder, hollow and having a central axis, open at the first and second ends thereof, and having an inwardly facing bore surface;

dashpot piston means, slidable axially and reciprocating in a first axial direction and a second, opposite axial direction within said cylinder, having a first side facing in a first axial direction and having a second side facing in a second axial direction opposite the first axial direction and having a peripheral portion adjacent the bore surface of said cylinder;

peripheral sealing means mounted on said peripheral portion of said dashpot piston means for forming a slidable seal between the peripheral portion of said dashpot piston means and said bore surface for preventing the passage of fluid therebetween;

a first rod portion connected to the first side of said dashpot piston means and extending in said first axial direction;

a second rod portion connected to the second side of said dashpot piston means and extending in said second axial direction;

a first stationary sealing means positioned at said first end of said cylinder, in slidable sealing engagement with said first rod portion and forming a first sealed annular working chamber for containing fluid within said cylinder between said first stationary sealing means and said piston;

a second stationary sealing means positioned adjacent said second end of said cylinder, in slidable sealing engagement with said second rod portion and forming a second sealed annular working chamber for containing fluid within said cylinder between said second stationary sealing means and said piston;

at least one narrow fluid passage through said dashpot piston means having a first passage end in fluid communication with said first working chamber and a second passage end in fluid communication with said second working chamber for the resistive flow path of fluid between said working chambers when said dashpot piston means reciprocates within said cylinder;

a first cavity in said first rod portion having a smooth cylindrical wall, said first cavity closed by a movable reservoir piston means, said reservoir piston means in slidable sealing engagement with said cylindrical wall forming a sealed hydraulic fluid reservoir, said reservoir piston means provided with spring bias means urging said piston means to reduce the volume of said reservoir; and a fluid conduit in fluid connection with said reservoir and said narrow fluid passage at a point intermediate said passage ends, said fluid conduit and said fluid passage providing a flow path having fixed dimensions and being devoid of valves.

2. The device according to claim 1, including access means in which access is provided for insertion of measuring means to measure the position of said reservoir piston means relative to said first rod portion for ascertaining the volume of fluid remaining in said reservoir.

3. The device according to claim 2, in which said first and second sealing means include resilient annular sealing rings having an L-shaped cross section.

4. The device according to claim 2, in which said first and second stationary sealing means include resilient annular sealing rings having a T-shaped cross section.

5. The device according to claim 2, further comprising:

a second cavity in said second rod portion;

a centering compression spring within said second cavity disposed between said second rod portion and said second stationary sealing means for determining the position of said dashpot piston when no load is applied.

6. The device according to claim 5, in which said first and second working chambers are symmetrical, having equal inner diameter walls and equal outer diameter walls, whereby movement of said dashpot piston means produces equal and opposite volume changes in said first and second working chambers with one increasing when the other decreases and the flow paths to said reservoir and to each other are of equal length for symmetrical damping function in both said first and second directions.

7. A hydraulic damping device adapted for connection between two relatively movable members of the type in which a piston reciprocates within a fluid-filled cylinder, said device comprising:

said cylinder body, hollow and having a central axis, open at a first end thereof and partially closed by a partition coextensive with said cylinder body at a second end thereof, said partition provided with a coaxial opening therethrough, said cylinder body having an inwardly facing bore surface forming the outer wall of a cylindrical hydraulic fluid compartment:

dashpot piston means, slidable axially and reciprocatingly in a first axial direction and a second opposite axial direction within said compartment, having a first side facing in a first axial direction and having a second side facing in a second axial direction opposite the first axial direction and having a peripheral portion adjacent the bore surface of said compartment;

peripheral sealing means mounted on said peripheral portion of said dashpot piston means for forming a slidable seal between the peripheral portion of said dashpot piston means and said bore surface for preventing the passage of fluid therebetween;

a first tube connected to the first side of said dashpot piston means and extending in said first axial direction;

a second tube connected to the second side of said dashpot piston means and extending in said second axial direction;

a first stationary sealing means mounted at said first end of said compartment, in slidable sealing engagement with said first tube and forming a first sealed annular working chamber for containing hydraulic fluid within said compartment between said first stationary sealing means and said dashpot piston means;

a second stationary sealing means mounted on an inner surface of said coaxial opening of said partition, in slidable sealing engagement with said second tube and forming a second sealed annular working chamber for containing hydraulic fluid within said compartment between said second stationary sealing means and said dashpot piston means;

at least one narrow fluid passage through said dashpot piston means having a first passage end in fluid communication with said first working chamber and a second passage end in fluid communication with said second working chamber for the resistive flow path of fluid between said working chambers when said dashpot piston means reciprocates within said cylinder;

said second tube having a smooth cylindrical inner wall forming a first cavity closed by a movable reservoir piston means, said reservoir piston means in slidable sealing engagement with said cylindrical inner wall forming a sealed hydraulic fluid reservoir, said reservoir piston means provided with spring bias means urging said reservoir piston means to reduce the volume of said reservoir; and a fluid conduit in fluid connection with said reservoir and said narrow fluid passage at a point intermediate said passage ends, said fluid conduit and said fluid passage providing a flow path having fixed dimensions and being devoid of valves.

8. The device according to claim 7, including access means in which access is provided for insertion of measuring means to measure the position of said reservoir piston means relative to said second tube for ascertaining the volume of fluid remaining in said reservoir.

9. The device according to claim 8, in which said first and second stationary sealing means include resilient annular sealing rings having an L-shaped cross section.

10. The device according to claim 8, in which said first and second stationary sealing means include resilient annular sealing rings having a T-shaped cross section.

11. The device according to claim 8, further comprising a centering compression spring within said first tube disposed between said piston and said first tube arranged for determining the position of said dashpot piston means when no load is applied.

12. The device according to claim 11, in which said first and second working chambers are symmetrical, having equal inner diameter walls and equal outer diameter walls, whereby movement of said dashpot piston means produces equal and opposite volume changes in said first and second working chambers with one increasing when the other decreases and the flow paths to said reservoir and to each other are of equal length for symmetrical damping function in both directions.

* * * * *